(12) United States Patent
Christopher

(10) Patent No.: US 10,354,648 B2
(45) Date of Patent: Jul. 16, 2019

(54) SYSTEM AND METHOD FOR SECURING INTELLIGENT AUTOMATED ASSISTANT DEVICES

(71) Applicant: STRATEGIC DATA SYSTEMS, San Diego, CA (US)

(72) Inventor: Kimberly Christopher, San Diego, CA (US)

(73) Assignee: STRATEGIC DATA SYSTEMS, San Diego, CA (US)

( * ) Notice: Subject to any disclaimer, the term of this patent is extended or adjusted under 35 U.S.C. 154(b) by 5 days.

(21) Appl. No.: 15/698,596

(22) Filed: Sep. 7, 2017

(65) Prior Publication Data

US 2019/0074002 A1 Mar. 7, 2019

(51) Int. Cl.
| | |
|---|---|
| *G10L 21/00* | (2013.01) |
| *G10L 15/22* | (2006.01) |
| *G10K 11/178* | (2006.01) |
| *H04N 5/225* | (2006.01) |
| *G10L 17/24* | (2013.01) |

(52) U.S. Cl.
CPC ............ *G10L 15/22* (2013.01); *G10K 11/178* (2013.01); *G10L 17/24* (2013.01); *H04N 5/2251* (2013.01); *G10K 2210/3044* (2013.01); *G10L 2015/223* (2013.01)

(58) Field of Classification Search
CPC ........ G06F 3/167; G06F 9/54; G06F 17/3087; G06F 17/28; G06F 17/30684; G06F 17/2765; G06F 17/30654; G06F 9/453; G06F 17/30014; G06F 17/30023; G06F 17/30026; G06F 17/30038; G06F 17/30873; G06F 17/30522; H04N 21/42203; H04N 21/2882; H04N 21/84; H04N 21/858; G06N 5/022; G06N 7/005; G06N 5/02; G06N 5/04; G06N 99/005
USPC ....... 704/275, 273, 228, 234, 235, 246, 247, 704/251, 252, 255, 270, 9, 270.1; 705/7.15; 706/11; 707/708, 999.01
See application file for complete search history.

(56) References Cited

U.S. PATENT DOCUMENTS

| | | | | |
|---|---|---|---|---|
| 8,660,849 B2 * | 2/2014 | Gruber | ............... | G06F 17/3087 704/275 |
| 8,677,377 B2 * | 3/2014 | Cheyer | ............... | G09B 21/00 719/310 |
| 8,892,446 B2 * | 11/2014 | Cheyer | ............... | G06F 17/3087 704/275 |
| 9,213,558 B2 * | 12/2015 | Tur | ............... | G06N 5/022 |
| 9,318,108 B2 * | 4/2016 | Gruber | ............... | G10L 15/1815 |
| 9,338,493 B2 * | 5/2016 | Van Os | ............... | G10L 15/22 |
| 9,495,129 B2 * | 11/2016 | Fleizach | ............... | G06F 17/30014 |

(Continued)

*Primary Examiner* — Vijay B Chawan
(74) *Attorney, Agent, or Firm* — Sheppard Mullin Richter & Hampton LLP

(57) ABSTRACT

Embodiments disclosed herein include security systems and methods for securing an intelligent automated assistant device comprising. In some embodiments, the security system may include an intelligent automated assistant device including a microphone and a camera. Additionally, the security device may be placed near the intelligent automated assistant device. The security device may also include security components to distort sounds from a sound source to be detected by the microphone. As a result, this may prevent third parties from at least remotely streaming or recording live audio from a microphone on the intelligent automated assistant device.

20 Claims, 6 Drawing Sheets

(56) References Cited

U.S. PATENT DOCUMENTS

| | | | | |
|---|---|---|---|---|
| 9,633,674 | B2* | 4/2017 | Sinha | G10L 25/00 |
| 9,858,925 | B2* | 1/2018 | Gruber | G10L 15/18 |
| 9,886,953 | B2* | 2/2018 | Lemay | G10L 15/28 |
| 9,971,774 | B2* | 5/2018 | Badaskar | G06F 17/30023 |
| 9,972,304 | B2* | 5/2018 | Paulik | G10L 15/01 |
| 2002/0194005 | A1* | 12/2002 | Lahr | G10L 15/24 |
| | | | | 704/271 |
| 2007/0100790 | A1* | 5/2007 | Cheyer | G09B 21/00 |
| 2007/0226033 | A1* | 9/2007 | LoPresti | G06Q 10/06 |
| | | | | 705/7.15 |
| 2012/0019978 | A1* | 1/2012 | Yoshida | H01C 7/18 |
| | | | | 361/301.4 |
| 2012/0166365 | A1* | 6/2012 | Tur | G06N 5/022 |
| | | | | 706/11 |
| 2012/0265528 | A1* | 10/2012 | Gruber | G10L 15/18 |
| | | | | 704/235 |
| 2013/0275164 | A1* | 10/2013 | Gruber | G10L 17/22 |
| | | | | 705/5 |
| 2015/0068069 | A1* | 3/2015 | Tran | H04B 1/385 |
| | | | | 36/136 |
| 2016/0260436 | A1* | 9/2016 | Lemay | G10L 15/28 |
| 2017/0358301 | A1* | 12/2017 | Raitio | G10L 13/033 |

* cited by examiner

SYSTEM AND METHOD FOR SECURING INTELLIGENT AUTOMATED ASSISTANT DEVICES

TECHNICAL FIELD

The disclosed technology relates generally to securing electronic devices. More specifically, in one embodiment, the disclosed technology relates generally to securing electronic devices that are connected to the internet and commanded by voice control.

BACKGROUND

Electronic devices continue to provide an ever growing number of functions, services, and applications as people continue to find ways to integrate them into our daily lifestyle. Indeed, current consumer electronic devices are available to instantly provide information and even perform select automated tasks at any given notice. For example, such popular electronic devices are the intelligent automated assistant devices that respond to voice commands and perform the recognized commands accordingly. Such examples of these intelligent automated assistant device include the Amazon Echo® with the Alexa voice control system, Google Home, Apple iPhone® with Siri voice system, Android phone with the Cortana voice recognition system, and the like. These intelligent automated assistant devices may then be connected to and control security systems (e.g., video, cameras, door locks, etc.), appliances, environment controls (e.g., heating and air conditioning controllers), and the like.

Due to their promise of convenience, these intelligent automated assistant devices with voice control technology are growing in popularity as they are now becoming a common item in many households, where some even have one placed in every room. More specifically, these intelligent automated assistant devices may be coupled with Internet technologies and even connected to other supported electronic devices and systems, which may allow these intelligent automated assistant to perform a greater number of applications and functions. As such, these intelligent automated assistant devices may then enable its users to verbally connect with the device and even control internet searches, entertainment systems, home appliances, environmental systems, security systems, and other electronic devices. However, while intelligent automated assistants offer the convenience of controlling a plurality of devices and systems all with a single electronic device, they also pose a serious potential threat to our personal privacy.

This is because most electronic assistants are always "listening" and on standby to hear for recognized audio commands. As such, the intelligent automated assistants may continuously and passively be gathering or monitoring auditory and even visual data. Furthermore, if the intelligent automated assistant devices are connected to the Internet, as most intelligent automated assistant devices are, it is a possible scenario that another person may remotely gain access and control of the intelligent automated assistant device without the owner's awareness or consent. Thus, the person may be able to gain access to any of the microphones and cameras located on the intelligent automated assistant device, which may then allow the person to stream or record live audio and visual feeds. Thus, the owner may be unaware that his or her intelligent automated assistant device has been compromised and that the area immediately surrounding the intelligent automated assistant device is no longer safe or private. Thus, there is a real privacy threat posed by these intelligent automated assistant devices.

BRIEF SUMMARY OF EMBODIMENTS

According to various embodiments of the disclosed technology, disclosed are security systems and methods for securing an intelligent automated assistant device in accordance to varying embodiments.

Some embodiments may include a security system which may include an intelligent automated assistant device comprising at least one of a first microphone and a security device placed near the intelligent automated assistant device, where the security device includes security components to distort sounds from a sound source to be detected by the first microphone.

In another embodiment, a method for securing an intelligent automated assistant device is provided. The method may include placing the security device at or near the intelligent automated assistant device. The security device may include a first security device placed near the intelligent automated assistant device, where the first security device includes security components to distort sounds from a sound source to be detected by a first microphone. The method may further include powering the first security device on via voice activation control and enabling security measures provided in the first security device to prevent the intelligent automated assistant device from collecting proper audio from the first microphone.

Other features and aspects of the invention will become apparent from the following detailed description, taken in conjunction with the accompanying drawings, which illustrate, by way of example, the features in accordance with embodiments of the invention. As such, the summary is not intended to limit the scope of the invention.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The following description is not to be taken in a limiting sense, but is made merely for the purpose of describing the general principles of the disclosed embodiments. The present embodiments address the problems described in the background while also addressing other additional problems as will be seen from the following detailed description. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Figure 1:
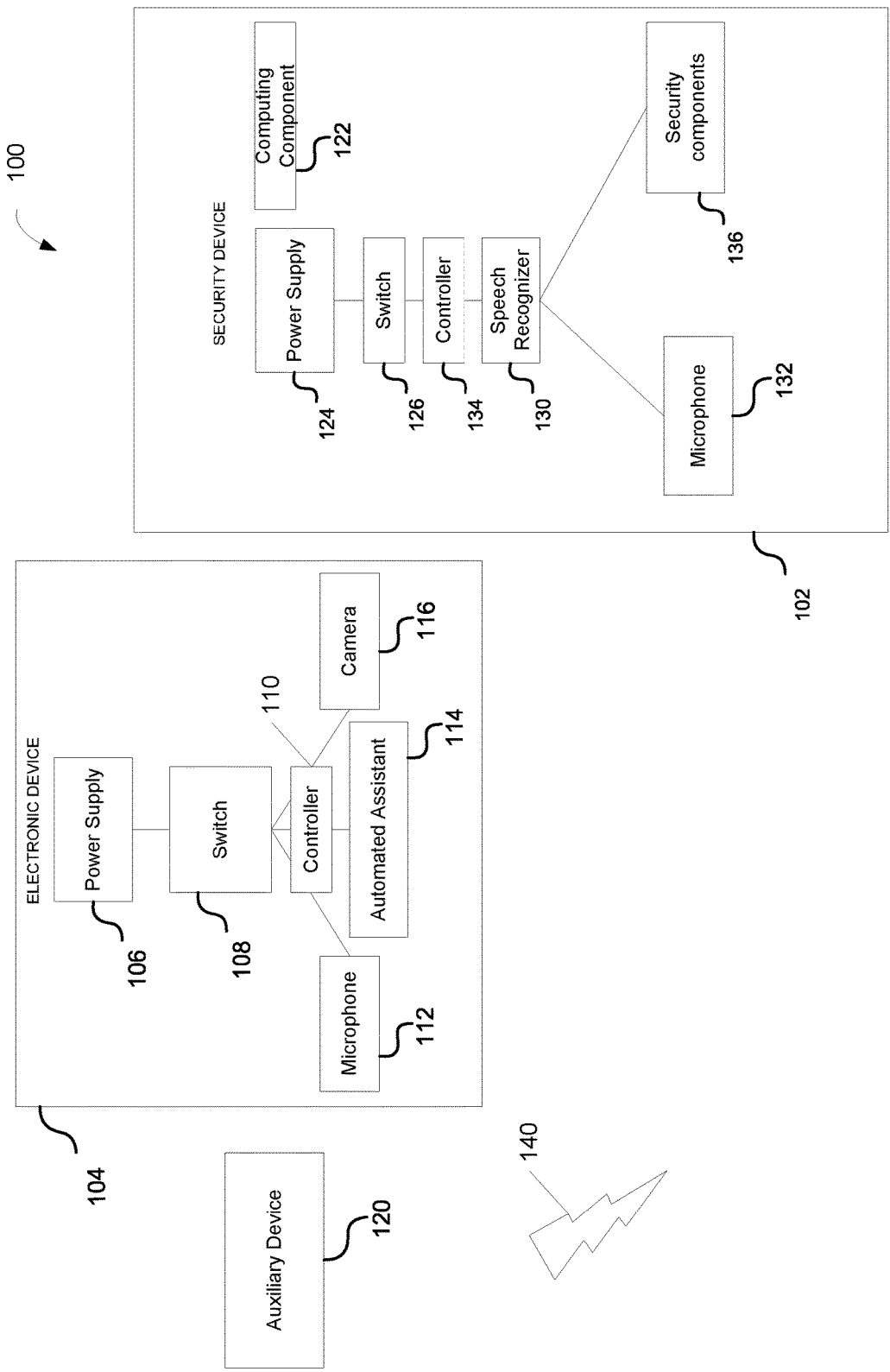
FIG. 1 is a schematic representation of a security system in accordance with various embodiments.

FIG. 1 is a schematic representation of a security system 100 in accordance with various embodiments. The security system 100 may include a security device 102 that is implemented to help provide increased privacy measures for electronic devices (e.g., intelligent automated assistant device) 104 configured with the intelligent automated assistant program 114. By way of example, the intelligent automated assistant program 114 may be configured to recognize and respond to voice commands and ensure that the recognized commands are carried out and executed accordingly.

More specifically, the intelligent automated assistant program 114 may control many features and operations of the electronic device 104 on which it is installed. Additionally, the intelligent automated assistant device 104 may also be connected to compatible auxiliary devices 120 (e.g., hand held devices, Bluetooth speakers, wireless appliances, etc.), thus allowing the electronic device 104 to also control those connected auxiliary devices 120. Thus, the intelligent automated assistant program 114 may be able to provide external services that interface with functionality and application available on the electronic device 104 itself or those from the auxiliary devices 120. For example, such functions and operations may include, for example, setting an alarm, making a telephone call, sending a text message or email message, adding a calendar event, lowering the thermostat, turning on the light, and the like.

The intelligent automated assistant program 114 may be in communication with the auxiliary devices 120 via a network 140 through a wireless communication or wired communication. The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol. The wireless communication may also include at least one of, for example, WiFi, Bluetooth, BLE, Zigbee, Infrared (IR) communication, and ultrasonic communication as a short-range communication protocol.

The intelligent automated assistant program 114 may also perform user requested functions and operations based on the verbal communications with the electronic device 104 via voice control or voice recognition. The microphone 112 may receive speech input signals, which may then be analyzed against a recognition set to detect and analyze the audio contents.

The controller 110 may also be coupled to the switch 108, where the switch 108 may turn off or turn on the power supply 106. Furthermore, the controller 110 may regulate the amount of power from the power supply 106 is distributed to the electronic device 104. For example, when the electronic device 104 is in a sleep mode or standby mode, low or minimal power may be distributed to the electronic device 104. In other instances, when the electronic device 104 is in the active mode, normal power may be distributed to the electronic device at full capacity.

Additionally, the electronic device 104 may also include a camera 116. By way of example, the camera 116 may provide live streaming of images and video feeds of the areas immediately surrounding the electronic device 104. In some instances, the camera 116 may provide continuous streaming of images and video feeds, which may then be uploaded onto a network or in a memory storage device. In other instances, the camera 116 may record images and video feeds upon user request for a select duration. In some embodiments, the camera 116 may be activated by select recognized voice commands. However, it should be noted that the electronic device 104 may or may not have a camera 116 and that the camera 116 is an optional feature.

Furthermore, in some embodiments, security system 100 may include a separate security device 102 that is not connected or coupled to the electronic device 104 with the intelligent automated assistant program 114. By having the security device 102 independent from and not connected to the electronic device 104 or the internet, this may ensure that any potentially hacked or compromised electronic devices 104 performed by unauthorized third parties cannot also hack into the security device 102 by linked or connected association. As such, instead, the security device 102 may include its own independent processor and software to employ the security measures against any potential privacy threats as described in further detail below.

By way of example, the security device 102 may include its own computing component 122, which may include bus, a processor, a memory, storage devices, input/output interface, and a communication interface. The security device 102 may also include its own independent power supply 124. In some instances, similar to the electronic device 104, the security device 102 may also be triggered to recognize and execute actions based on identification of recognized voice commands. Thus, similar to the electronic device 104, the security device 102 may include its own microphone 132 coupled to a speech recognizer 130. The microphone 132 may receive speech input signals, which may then be analyzed against a recognition set within the speech recognizer 130 to detect and analyze the audio contents. The speech recognizer 130 may be coupled to the controller 134, which may control the operations of the security device 102 based on the recognition results of the identified verbal commands. As a result, the microphone 132 and the speech recognizer 130 may allow a user to command the security device 102 and enable or disable security components 136 based on the recognized user commands. By way of example, the speech recognizer 130 may recognize voice commands that may enable powering on or off the security components of the security device 102. More information regarding the security components 136 are further described below in detail.

The controller 134 may also be coupled to the switch 126, where the switch 126 may turn off or turn on the power supply 124. Furthermore, the controller 134 may regulate the amount of power distributed from the power supply 124 to the security device 102. For example, when the security device 102 is in a sleep mode or standby mode, low or minimal power may be distributed to the security device 102. In other instances, when the security device 102 is in the active mode, normal power may be distributed to the security device 102 at full capacity.

Additionally, in some embodiments, the security device 102 may also include one or more security components 136. The security components 136 may include security features that ensure the privacy of the user of the electronic device 104 is not jeopardized by unwarranted third parties seeking to spy or monitor on an unsuspecting user via unapproved remote access to the microphone 112 and camera 116 on the electronic device 104. By way of example, the security components 136 may include a white noise component for generating and emitting white noise directed to the electronic device 104. By emitting white noise, the microphone 112 on the electronic device 104 may not be able to pick up and decipher conversations or other sounds from the room. As a result, the microphone 112 may then only be able to pick up these distorted or muffled noises.

By way of example, the white noise component may include a digital/analog converter coupled to a memory with prerecorded white noise sounds. The analog output with a digital/analog converter may be amplified with an audio amplifier and played through the speaker on the security device 102 in order to emit the white noise. It should be noted that the white noise components may include any of the standard components used to emit white noise as typically used and appreciated by any one of ordinary skill in the art.

Additionally, the security component may also include a noise cancelling component for cancelling sounds and noises generated from conversations and objects. This may further prevent and disrupt the electronic device 104 from picking up any clear audio. By way of example, the noise cancelling component may include detecting sounds and emitting sounds waves with the same amplitude but with inverted phase, also known as the antiphase to the original sound. By emitting such sound waves, this may then result in destructive interference with the original sound so that the microphone 112 from the electronic device 104 will not pick up clear audio from the sound source.

By way of example, the noise cancelling component may include a transducer to pick up any detected noises or sounds. The noise may be filtered through an amplifier and pass through a digital audio filter, where the noise signal may be analyzed. The noise signal may be broken down into its fundamental harmonics, which can result in one or more analyzed audio signals. The signals may then be passed onto the mixer circuit so that the signals are analyzed to then emit a sound wave that is inverted from the original sound signal. When the inverted sound wave is emitted from the security device 102, the electronic device 104 may receive both the sound signals of the original sound and that of the inverted sound wave, which may then result in the destructive inference so that the original sounds are no longer recognized. It should be noted that the noise cancelling components may include any of the standard components used to cancel or alter sounds as typically used and appreciated by any one of ordinary skill in the art.

Figure 2:
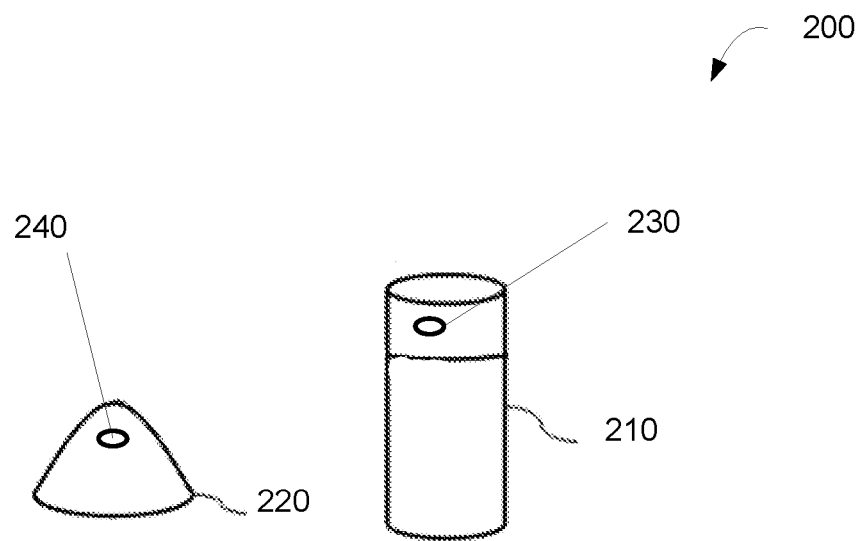
FIG. 2 illustrates a security system for an intelligent automated assistant device in accordance with one embodiment.

FIG. 2 illustrates a security system 200 that includes an intelligent automated assistant device 210 and a security device 220 in accordance with one embodiment. As illustrated, the security system 200 may also include a security device 220 that may provide the necessary security measures to prevent third parties from recording or streaming live conversations picked up by the microphone 230 of the intelligent automated assistant device 210. As a result, the security device 220 may include security components associated that distort, muffle, and conceal the conversations to prevent the microphone 230 from detecting or receiving clear sound signals from a sound source.

By way of example, such security components may include emitting white noise and noise cancelling signals towards the intelligent automated assistant device 210. As a result, even if a third party were to remotely access the intelligent automated assistant device 210 and its microphone 230, the security device 220 will ensure that any recorded or streamed audio feed picked up by the microphone 230 of the intelligent automated assistant device 210 will be distorted, muffled, or jammed. Thus, the user's privacy may be maintained even if a third party were to remotely access the intelligent automated assistant device 210.

In some embodiments, the intelligent automated assistant device 210 may be powered on or off. By way of example, the intelligent automated assistant device 210 may be powered on and off via recognized voice commands. When the intelligent automated assistant device 210 is powered on to be used by a user, the security device 220 may be turned off in order to ensure proper operation of the intelligent automated assistant device 210. By way of example, the security device 220 may also be appropriately turned on or turned off via appropriate recognized voice commands. For example, the microphone 240 on the security device 220 may continuously detect for audible noise and analyze such noises for recognized voice commands.

Figure 3:
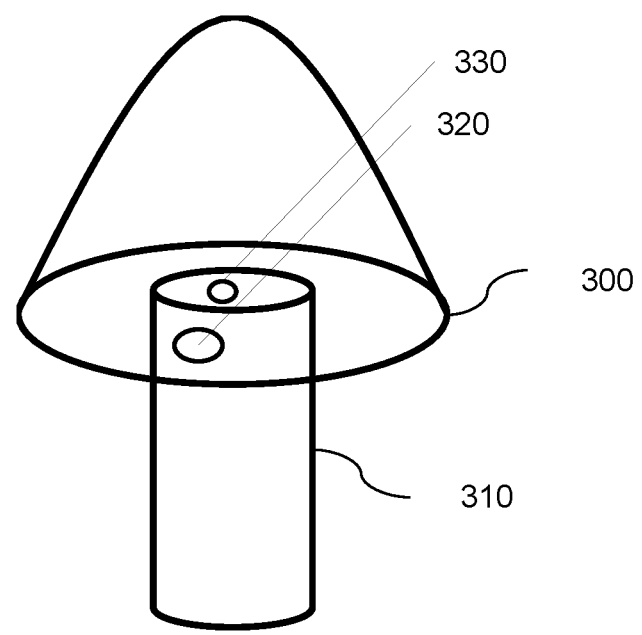
FIG. 3 illustrates a security device placed over an intelligent automated assistant device to in accordance to one embodiment.

FIG. 3 illustrates a security device 300 placed over an intelligent automated assistant device 310 in accordance with various embodiments. The security device 300 may be cone shaped so that it may be easily placed over objects of various sizes and shapes, such as various intelligent automated assistant devices 310. In some instances, the cone shaped security device 300 may be balanced on top of the intelligent automated assistant device 310 without any additional structural support. However, it should be noted that the security device 300 is not limited to a cone shape. Instead, the security device 300 may come in any shape or size as needed to cover or envelope certain areas of the intelligent automated assistant device 310, such as the areas where the camera 320 is located. For example, the shape of the security device 300 may include a square prism, rectangular prism, cylinder, sphere, pyramid, and the like.

Additionally, the security device 300 may also include the above mentioned security components that will allow the emittance of white noise and noise cancelling signals at the intelligent automated assistant device 310. Thus, the security device 300 may also be able to ensure that any recorded or streamed audio feed picked up by the microphone 330 will be distorted, muffled, or jammed.

Furthermore, the security device 300 may be supported by structural elements (not shown here) to keep the security device 300 supported and balanced on top of the intelligent automated assistant device 310. In some instances, the structural elements may be adjusted in length so as to accommodate varying heights of the intelligent automated assistant devices 310.

Figure 4A:
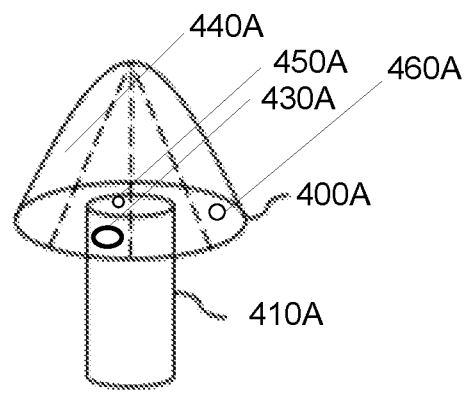
FIG. 4A illustrates a security cover in an active mode placed over an intelligent automated assistant device in accordance with one embodiment.
Figure 4B:
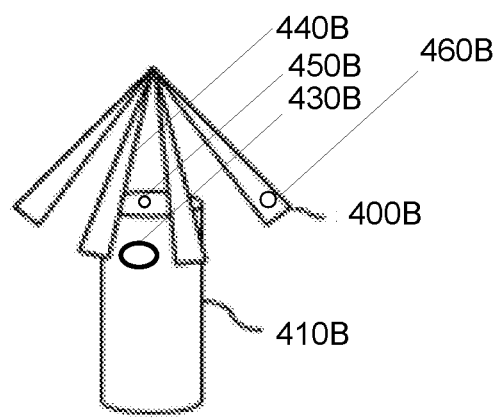
FIG. 4B illustrates a security cover in a non-active mode placed over an intelligent automated assistant device in accordance with one embodiment.

FIG. 4A illustrates a security device 400A in an active mode placed over an intelligent automated assistant device 410A in accordance with one embodiment. Additionally, FIG. 4B illustrates a security device 400B in a non-active mode placed over an intelligent automated assistant device 410B in accordance with one embodiment. Both FIGS. 4A and 4B will be explained herein together in detail.

In FIG. 4A, the active mode may be designated when the security device 400A is appropriately enveloped to completely surround or cover select areas of the intelligent automated assistant device 410A. The components of the security device 400A may include those as described above with reference to FIG. 3. By way of example, the security device 400A in the closed mode may completely cover the top portions of the intelligent automated assistant device 410A, especially in areas where the camera 430A may be located. By appropriately placing the security device 400A over the camera 430A, the camera 430A will no longer be able to take images or videos of the immediately surrounding space or area where the intelligent automated assistant device 410A is located. Thus, even in the instance where a third party may gain unapproved remote access to the camera 430A of the intelligent automated assistant device 410A, the security device 400A may effectively block the third party from streaming or recording images/video feed of the surrounding areas. Instead, the third party will only be able to view a blacked out image or video feed as a result of the security device 400A effectively covering the camera 430A.

In some instances, the security device 400A may also be composed of sectionalized pieces 440A, where the sectionalized pieces overlap, fold, and/or slide in order to provide openings of the security device 400A itself. By doing so, this may also expose the areas of the intelligent automated assistant device 410B that were once covered, as further depicted in FIG. 4B.

As illustrated in FIG. 4B, the sectionalized pieces 440B of the security device 400B may be overlapped to provide openings within the security device 400B. When the openings are created, this may indicate that the security device 400B is now in the non-active mode, where one or more of the security features or components are deactivated and thus allow continued full operation of the intelligent automated assistant device 410B. More specifically, the openings may now allow the camera 430B to be exposed to the environment. Additionally, in the non-active mode, this may further expose the microphone 450B to the environment, which may allow the microphone 450B to more readily pick up and recognize the voice command and record sounds.

Furthermore, in the non-active mode, some or all of the security components featured within the security device 400A, 400B may be disengaged. For example, some of the security components featured in the security device 400A, 400B may include emitting white noise and/or noise cancelling signals. Because employing the white noise and noise cancelling signals may effectively interfere with the original sounds, such security components may hinder and interfere with the microphone's 450B ability to pick up and/or record distinct audible conversations from the room. As a result, when in the non-active mode, the security components may be disengaged so that the intelligent automated assistant device 410B is able to resume operation and be able to properly detect for audio and voice commands without any interference.

However, when the user no longer is engaged with the intelligent automated assistant device 410B, the user may revert the security device 400B to active mode so that the security components may be engaged and operational. This may then give the user peace of mind that the intelligent automated assistant device 410A cannot listen or record the user's conversations or take images and videos of the surrounding areas.

To revert from active mode to non-active mode and vice versa, by way of example, the user may physically fold or slide the sectionalized pieces 440A, 440B. In some instances, when the sectionalized pieces 440A, 440B are folded or rotated to expose openings and the intelligent automated assistant device 400A, 400B, this may trigger the powering off the security device 400A, 400B, or at least deactivating the security components. On the contrary, when the sectionalized pieces 440A, 440B are expanded to eliminate any gaps or opening, this may trigger the turning on the security device 400A, 400B and at least activating one or more of the security components.

In other instances, the security device 400A, 400B may be triggered to be in the active or non-active mode based upon voice commands. For example, in the instance that the user seeks to place the security device 400A, 400B in the active mode, the security device 400A, 400B may be configured so that the sliding and rotating of the sectionalized pieces 440A, 440B is automated. The security device 400A, 400B may detect and recognize the voice commands from the user via the microphone 460A, 460B and the speech recognizer within the security device 400A, 400B itself. When the voice commands are recognized, the security device 400A, 400B may slide and rotate the sectionalized pieces 440A, 440B accordingly, which may then trigger the powering on or off the security device 400A, 400B.

Figure 5:
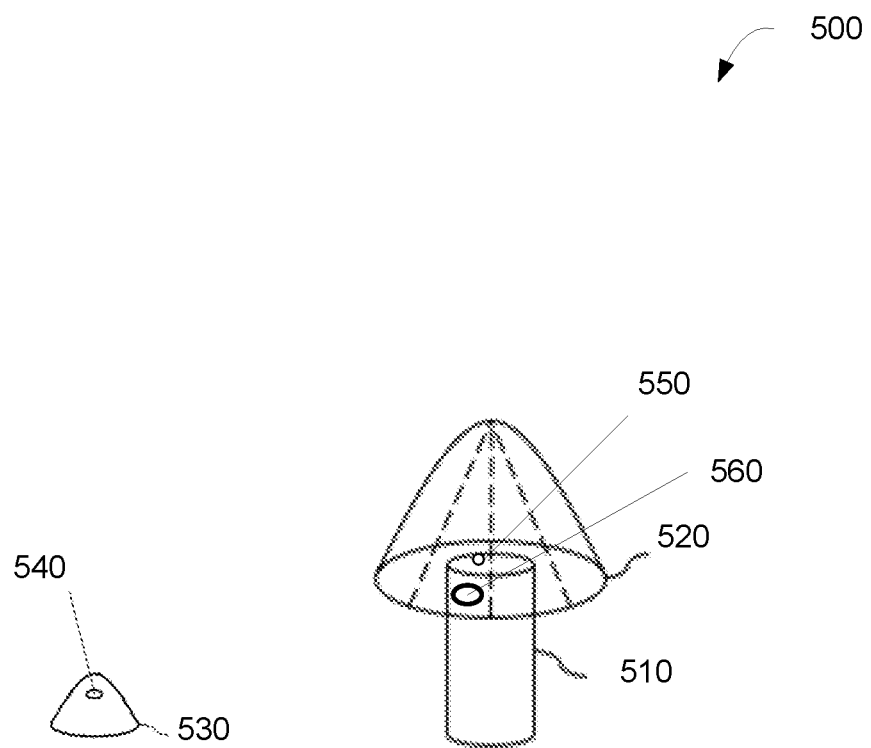
FIG. 5 illustrates a security system that includes an intelligent automated assistant device and a first security device and a second security device in accordance with one embodiment.

FIG. 5 illustrates a security system 500 that includes an intelligent automated assistant device 510 and a first security device 520 and a second security device 530 in accordance with one embodiment. The components of the first security device 520 and the second security device 530 may include those as described above with reference to FIGS. 2 and 3.

In some embodiments, the second security device 530 may be configured to enable the first security device 520 in the active mode and in the non-active mode. Thus, the second security device 530 may transmit a signal to the receiver in the first security device 520, wherein the signal provides instructions as to whether the first security device 520 is to operate in the active mode or in the non-active mode. In some instances, the second security device 530 may direct the mode of operation of the first security device 520 in response to audio commands from the user. For example, the second security device 530 may include a speech recognizer software where it can detect for audio commands picked up by the microphone 540. Thus, in the instance that the user requests the active mode of the first security device 520, the second security device 530 may detect the recognized commands via the microphone 540 and transmit a signal to the first security device 520 directing it to operate in the active mode.

Furthermore, when the user has finished utilizing the intelligent automated assistant device 510 for the time being, the user may then activate the security features of the second security device 530 to prevent potential third parties from recording or streaming live conversations picked up by the microphone 550 or camera 560 of the intelligent automated assistant device 510. To power on/off the second security device 530, the user may manually do so with the push of the power button on the second security device 530 itself. In other instances, powering on and powering off of the second security device 530 may be automated. For example, the second security device 530 may include a speech recognizer software where it can detect for audio commands picked up by the microphone 540. Upon recognized commands, the second security device 530 may then power on/off based on the user's communicated request.

Additionally, the first security device 520 and the second security device 530 may include security features that may be activated only when the user has input the proper password or authentication credentials. For example, the first security device 520 and the second security device 530 may request that the user audibly dictate the combination of words, letters, phrases, numbers, etc. In further embodiments, the first security device 520 and the second security device 530 may have an input device, such a keyboard or screen, for the user to manually input the key word or password. The first security device 520 and the second security device 530 may be locked until the proper password is entered. The password may be stored in the memory or data storage of the first security device 520 and the second security device 530, respectively.

In some instances, the first security device 520 and the second security device 530 may have different passwords, thus requiring the user to unlock the first security device 520 and the second security device 530 separately. In other instances, both the first security device 520 and the second security device 530 may share the same password, and thus may be unlocked simultaneously. However, it should be noted that other authentication methods may also be used, such as biometric authentication and other methods as would be appreciated by any one of ordinary skill in the art. It should be noted that first security device 520 and the second security device 530 individually may each have its own security password. Thus, the first security device 520 and the second security device 530 disclosed in FIGS. 2 and 3 may also each have their own password protection security as described here with respect to FIG. 5.

Figure 6:
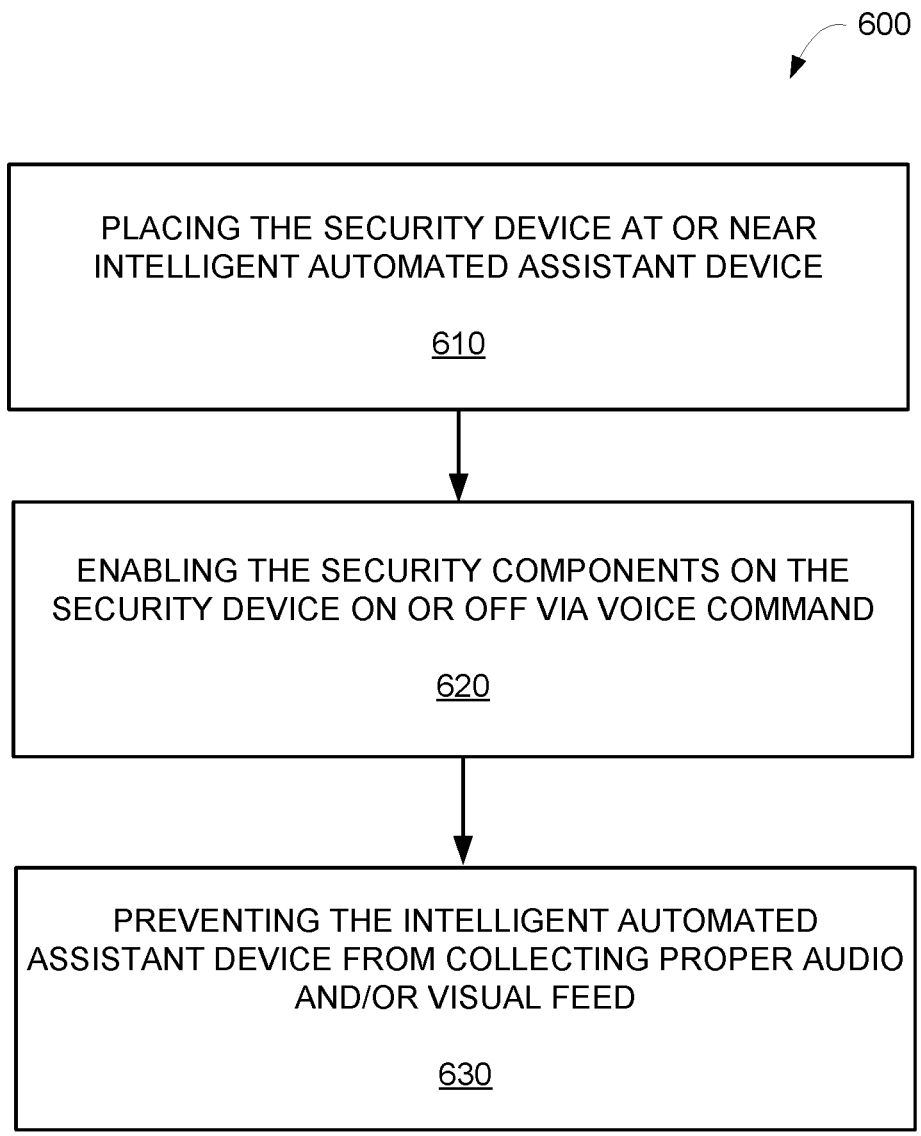
FIG. 6 illustrates an exemplary process for securing an intelligent automated assistant device in accordance to varying embodiments.

FIG. 6 illustrates an exemplary process for securing an intelligent automated assistant device in accordance to varying embodiments. The exemplary process 600 may begin at step 610, where the security device may be placed on or near the intelligent automated assistant device. In this instance, the term "near" may be used to define any determined distance where the signal or sound waves from the security device is able to reach the intelligent automated assistant device.

In some instances, the security device may be composed of one component (e.g., one device total) or a total of two or more components (e.g. two or more devices in total). In the instance that the security device is composed of one component, the first component may be configured to at least distort, muffle, and conceal the sounds to be picked up by the microphone of the intelligent automated assistant device. As such, the first component may be placed near the intelligent automated assistant device to emit the white noise and noise cancelling signals towards the microphone of the intelligent automated assistant device.

In the instance that the security device is composed of at least two components, the first component is placed near the intelligent automated assistant device to at least distort, muffle, and conceal the sounds to be picked up by the microphone of the intelligent automated assistant device and the second component may be at least be a physical covering that shields the camera located on the intelligent automated assistant device. In such instances, the second component may be placed on top of the intelligent automated assistant device itself to at least shield or cover the camera located on the intelligent automated assistant device. However, it should be noted that the second component may also include the security components featured in the first component, such as those to distort, muffle, and conceal the sounds to be picked up by the microphone of the intelligent automated assistant device.

Next, the process 600 may proceed to step 620, where the security device may be powered on by voice activation to activate the security measures. In some instances, the security device may be password protected.

Next, the process 600 may proceed to step 630, where the security features or components of the security device may be implemented to the intelligent automated assistant device. These security features may prevent the camera and/or microphone from the intelligent automated assistant device from collecting proper audio and visual feed. By way of example, one of the security components may be to physically cover the camera of the intelligent automated assistant device. In other instances, the other security features may be to emit the white noise and noise cancelling signals towards the microphone of the intelligent automated assistant device, and thus effectively distorting, muffling, and concealing the sounds to be picked up by the microphone so that clear audio is not transmitted.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

What is claimed is:

1. A security system for securing an intelligent automated assistant device comprising:
   an intelligent automated assistant device comprising a first microphone; and
   a security device placed near the intelligent automated assistant device, wherein the security device comprises security components to distort sounds from a sound source to be detected by the first microphone.

2. The security system of claim 1, wherein the security device comprises a second microphone and speech recognition software to enable voice activation control.

3. The security system of claim 2, wherein the security device is placed over the intelligent automated assistant device to cover at least a camera on the intelligent automated assistant device.

4. The security system of claim 2, wherein the security device comprises sectionalized pieces that slide, rotate, or fold to expose openings from the physical cover.

5. The security system of claim 3, wherein the openings from the physical cover expose the camera of the intelligent automated assistant device to an environment.

6. The security system of claim 2, wherein the security device comprises a second microphone and speech recognition software to enable voice activation control.

7. The security system of claim 5, wherein the sectionalized pieces, slide, rotate, or fold in response to a recognized voice command.

8. The security system of claim 1, wherein the security components comprise emitting white noise and noise cancelling signals.

9. The security system of claim 1, wherein the security components are enabled upon authentication approval comprising a verified password.

10. A security system for securing an intelligent automated assistant device comprising:
    an intelligent automated assistant device comprising a first microphone; and
    a device comprising:
      a first security device placed near the intelligent automated assistant device, wherein the first security device comprises security components to distort sounds from a sound source to be detected by the first microphone.

11. The security device of claim 9, wherein the device further comprises a second security device placed on or over the intelligent automated assistant device to provide a physical cover to select areas of the intelligent automated assistant device and cover at least a camera on the intelligent automated assistant device.

12. The security system of claim 10, wherein the openings from the physical cover expose the camera of the intelligent automated assistant device to an environment.

13. The security device of claim 10, wherein the first security device comprises a second microphone and speech recognition software to enable voice activation control of the first security device.

14. The security device of claim 10, wherein each of the first security device and the second security device comprise a microphone and a speech recognition software to enable voice activation control to activate the sliding, rotating, or folding of the sectionalized pieces and to enable the security components in response to recognized voice commands.

15. The security device of claim 10, wherein the security components comprise emitting white noise and noise cancelling signals.

16. The security device of claim 10, wherein the security components are enabled upon authentication approval comprising a verified password.

17. A method for operating a security device for securing an intelligent automated assistant device comprising:
    placing the security device at or near the intelligent automated assistant device, wherein the security device comprises:
      a first security device placed near the intelligent automated assistant device, wherein the first security device comprises security components to distort sounds from a sound source to be detected by a first microphone;
    powering the first security device via voice activation control; and
    enabling security measures provided in the first security device to prevent the intelligent automated assistant device from collecting proper audio from the first microphone.

18. The method of operating a security device of claim 17, wherein the security device further comprises a second security device placed on or over the intelligent automated assistant device to provide a physical cover to select areas of the intelligent automated assistant device and to cover a camera.

19. The method of operating a security device of claim 17, wherein each of the first security device and the second security device comprise another microphone and a speech recognition software to enable voice activation control to activate the sliding, rotating, or folding of the physical cover and to enable the security components in the second security device in response to recognized voice commands.

20. The method of operating a security device of claim 17, wherein the security components comprise emitting white noise and noise cancelling signals.

* * * * *